US012703008B2

(12) United States Patent
Xu

(10) Patent No.: US 12,703,008 B2
(45) Date of Patent: Aug. 11, 2026

(54) GAS FLOW SEPARATION OF POWDERED METAL

(71) Applicant: RTX Corporation, Farmington, CT (US)

(72) Inventor: JinQuan Xu, East Greenwich, RI (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/633,810

(22) Filed: Apr. 12, 2024

(65) Prior Publication Data

US 2025/0319491 A1 Oct. 16, 2025

(51) Int. Cl.
*B07B 4/02* (2006.01)
*B07B 11/06* (2006.01)
*B07B 15/00* (2006.01)

(52) U.S. Cl.
CPC ................ *B07B 4/02* (2013.01); *B07B 11/06* (2013.01); *B07B 15/00* (2013.01)

(58) Field of Classification Search
CPC ............ B07B 4/02; B07B 11/06; B07B 15/00
See application file for complete search history.

(56) References Cited

U.S. PATENT DOCUMENTS 4,312,748 A * 1/1982 Rozmus .................... B07B 7/04 209/32
10,166,603 B2 1/2019 Kawada et al.
10,335,854 B2 7/2019 Wiesner et al.
11,433,616 B2 9/2022 Lauer et al.
11,772,162 B2 10/2023 Anam et al.
2009/0040270 A1* 2/2009 Silverbrook ............. B41J 2/155 347/42
2012/0048975 A1* 3/2012 Gitschel .................. B03C 1/247 241/24.13

FOREIGN PATENT DOCUMENTS

CN 102744213 A * 10/2012

* cited by examiner

*Primary Examiner* — Michael McCullough
*Assistant Examiner* — Kalyanavenkateshware Kumar
(74) *Attorney, Agent, or Firm* — Bachman & LaPointe, P.C.

(57) ABSTRACT

A method for gas flow separation of powders includes establishing a stream of mixed powders; and applying a cross-flow stream of gas to the stream of mixed powders such that powders of different density are displaced by the cross-flow stream to a different extent, thereby forming separate streams of powders having different density. An apparatus is also disclosed.

17 Claims, 2 Drawing Sheets

GAS FLOW SEPARATION OF POWDERED METAL

FIELD

The present disclosure relates to a method for separating metal powders such as powders of superalloy from contaminants.

BACKGROUND

Many items are manufactured from alloy powders such as, for example, nickel-based superalloys. Contaminants in the alloy powders can lead to defects in the final product. For example, alloy powders can be used to make gas turbine engine disks that normally have excellent properties. When contaminants are in the powder, however, this can lead to early cracks in the disk, for example.

SUMMARY OF THE DISCLOSURE

In one non-limiting embodiment, a method for gas flow separation of powders, comprises establishing a stream of mixed powders; and applying a cross-flow stream of gas to the stream of mixed powders such that powders of different density are displaced by the cross-flow stream to a different extent, thereby forming separate streams of powders having different density.

In a non-limiting configuration, the stream of mixed powders comprises a stream of superalloy powder mixed with contaminants having lower density than the superalloy powder.

In another non-limiting configuration, the superalloy powder comprises nickel-based superalloy powder.

In still another non-limiting configuration, the contaminants are selected from the group comprising silica, alumina and mixtures thereof.

In a further non-limiting configuration, the establishing step comprises flowing the mixed powders through a nozzle to create the stream of mixed powders.

In a still further non-limiting configuration, the nozzle establishes a jetting speed for the mixed powders of between 1 and 100 m/s.

In another non-limiting configuration, the nozzle has a straight-line configuration and establishes a nozzle per inch of between 100 and 2,400 nozzles per inch (NPI).

In still another non-limiting configuration, the nozzle comprises a slot.

In a further non-limiting configuration, the cross-flow stream of gas comprises a flow of air, $CO_2$ or inert gas.

In still another non-limiting configuration, the inert gas is argon.

In a further non-limiting configuration, the method further comprises collecting separated powders from the separate streams of powders having different densities.

In a still further non-limiting configuration, the collecting step is conducted using a moving web apparatus to catch and transport at least one of the separated powders.

In another non-limiting configuration, the moving web catches the separated metal alloy powder and conveys the separated metal alloy powder to a further station for use.

In still another non-limiting configuration, the establishing step is conducted with a gas that matches a gas used for the step of applying the cross-flow.

In a further non-limiting configuration, the method further comprises the step of sieving a starting group of mixed powders into different size groups, and then conducting the step of establishing the stream of the mixed powders for each of the different size groups.

In still another non-limiting configuration, the different size groups comprise a first group having particle sizes greater than 100 and up to 125 microns, a second group having particle sizes between greater than 75 microns and up to 100 microns, a third group having particle sizes between greater than 55 microns and up to 75 microns, and a fourth group having particles between 40 microns and 55 microns.

In a further non-limiting configuration, the method further comprises feeding at least one of the separate streams of powders having different density to an electric or electromagnetic further separation step.

In another non-limiting embodiment, an apparatus for gas flow separation of powders comprises a nozzle for establishing a stream of mixed powders; and a source of a stream of gas oriented to direct a cross-flow stream of gas across the stream of mixed powders such that powders of different density are displaced by the cross-flow stream to a different extent, thereby forming separate streams of powders having different density.

In a non-limiting configuration, the nozzle has a straight-line configuration and establishes a nozzle per inch of between 100 and 2,400 nozzles per inch (NPI).

In another non-limiting configuration, the apparatus further comprises a moving web apparatus arranged to collect and transport at least one of the separate streams of powders.

The foregoing features and elements may be combined in various combinations without exclusivity, unless expressly indicated otherwise. These features and elements, as well as the operation thereof, will become more apparent in light of the following description and the accompanying drawings. It should be appreciated that the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option. Further, any steps in a method discussed herein may be performed in any suitable order or combination. Additionally, any reference to without contact (or similar phrases) may also include reduced contact or minimal contact. It should also be understood that unless specifically stated otherwise, references to “a”, “an”, or “the” may include one or more than one and that reference to an item in the singular may also include the item in the plural. Further, all ranges may include upper and lower values and all ranges and ratio limits disclosed herein may be combined.

Figure 1:
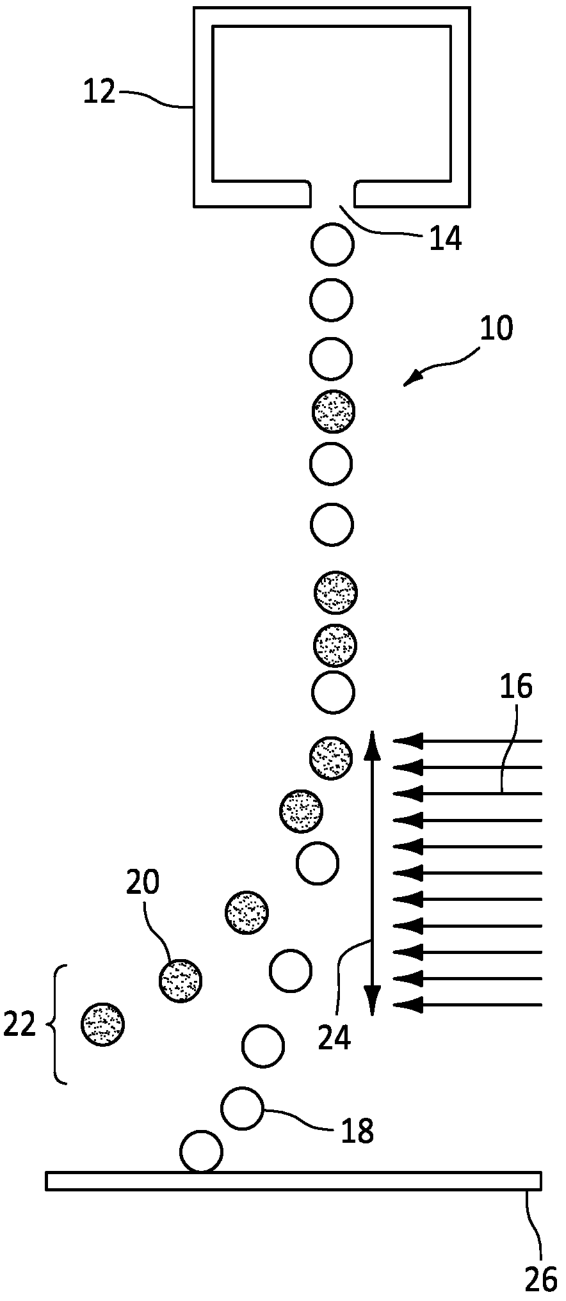
FIG. 1 is a schematic illustration of a method according to one non-limiting embodiment.

This disclosure relates to a method for separation of contaminants from alloy powders such as nickel-based superalloys. It is not uncommon for a supply of alloy powder such as nickel-based superalloy powder to contain some contaminants, and the method as disclosed herein helps to remove the contaminants. FIG. 1 is a schematic illustration of this method, and shows a stream 10 of a mixture of nickel-based superalloy powder and contaminants. The superalloy has a much higher density than the lower density contaminants. As shown, stream 10 can be generated from a pressured sieving nozzle 12 or similar structure that can be used to generate stream 10. As will be discussed below, a sieving nozzle can be useful in order to pre-separate the starting mixed powder material by particle size. One non-limiting example of a sieving nozzle can be as simple as an opening or aperture 14 of a desired size, that can be adjusted as needed.

As shown, stream 10 is subjected to a cross-flow 16 of air, $CO_2$ or an inert gas such as argon. Cross-flow 16 is angled to be substantially transverse to the direction of movement of the stream 10 of powders. In other words, the cross-flow is directed across the stream of powders. This cross-flow 16 impacts the path of the particles differently based upon a density of the particular particle. Thus, heavier particles will be displaced less than lighter particles. Since the contaminants are generally much less dense than the superalloy particles, they are displaced further by cross-flow 16, and this separates the powders by density. As shown in FIG. 1, the metal alloy powders will be displaced to a lesser extent that can be represented by first separated stream 18, while the contaminant powder stream 20, being lighter than the superalloy powder, will be displaced further into another separate stream 20. From these locations, the superalloy stream 18 can be collected for one purpose while the contaminant stream 20 can be collected and recycled to other useful purposes.

Contaminant particles can typically have densities in the range of 1000 $kg/m^3$ to 4000 $kg/m^3$. Two common contaminants are alumina and silica, which have typical density of 3990 $kg/m^3$ and 2200 $kg/m^3$ respectively.

As shown in FIG. 1, it can be desirable for the mixed powders to be fed through a nozzle 12 so that they can be ejected from the nozzle in a stream such that cross-flow 16 can displace the powders with little or no interaction between the separate particles of powder. This can be accomplished with a number of different flow nozzles or pressured sieving nozzles. For example, the nozzles may be pressured so that powders are ejected at a predetermined jetting speed of, for example, between 1 and 100 m/s. In another non-limiting configuration, the jetting speed can be between 10 and 50 m/s, for example 20 m/s. This may be accomplished with pressure from argon, air, $CO_2$, supercritical $CO_2$ and the like. In this regard, the pressure or nozzle driving gas may in one non-limiting configuration be the same as the cross-flow gas. That is, the gas used to establish the stream of powder can be the same gas that is used to establish the cross-flow. Jetting speed and cross-flow speed may also be optimized to achieve desired separation.

Figure 3:
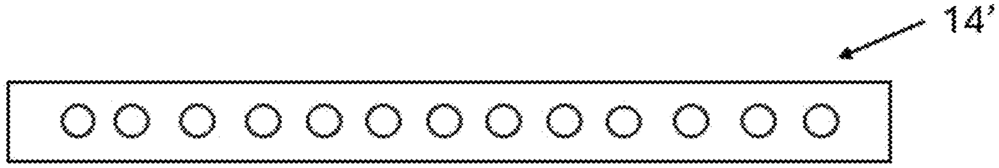
FIG. 3 schematically illustrates a nozzle having a straight-line configuration.

When a plurality of nozzles are used, the nozzle density may be ranged from 100 nozzles per inch (NPI) to 2400 NPI depending on powder metal sizes and cross-flow velocity and other operating parameters. Nozzles per inch are determined based upon the number of nozzles aligned substantially in a straight line along a desired nozzle configuration, such as a nozzle 14' having a straight-line configuration as shown in FIG. 3. The nozzle can be in the form of a slot as well. In this case, the slots can have a suitably selected width, and since the particles are assumed to be substantially spherical, then the width of the slot will correspond to the width or diameter of a substantially spherical particle that is the largest size that can pass through the slot.

Cross-flow 16 can be generated from air, $CO_2$ or from one or more inert gases such as argon and the like. Velocity of the cross-flow gas can be selected based upon the expected densities of the different metal alloy and contaminant particles or powders. As one non-limiting example, this velocity can be between 5 and 200 m/s, and in another non-limiting configuration, the velocity can be 20 m/s.

Cross-flow 16 can be established from the suitable gas using any air handling unit or fan or other pressurized source of the gas passed through a suitable nozzle. Alternatively or additionally, a suction device may be used to establish the cross-flow. In addition to the velocity of the flow, the height of the flow also can be selected to influence the powders or particles along a longer or shorter path and thereby influence the powders to a lesser or greater extent.

In a non-limiting configuration, the alloy powders of interest can be nickel-based superalloy powder, and the typical contaminants to be removed can be selected from the group comprising silica, alumina and combinations thereof. A broader but nevertheless non-limiting group of potential contaminants can include, without limitation, silica, silicone, silicon carbide, alumina, magnesia, aluminum metal, polyvinylchloride, nitrile rubber and mixtures thereof.

As schematically illustrated in FIG. 1, cross-flow 16 displaces the low density contaminant particles further than the higher density metal powders. Thus, in the lower portion 22 of the illustration of FIG. 1, different particle collection devices can be deployed to collect the nickel-based superalloy powder in the one hand and the contaminants on the other hand. FIG. 1 illustrates one non-limiting configuration including a moving web device or apparatus 26, which can capture in this case the separated alloy particles and transport them to further use or treatment. Similar apparatus can be positioned to capture the stream(s) of contaminants as well.

In one non-limiting configuration, the mix of alloy powder can originally be treated before being generated into stream 10. One such suitable treatment is to pre-sieve the powder such that the particles ejected through nozzle 12 are of substantially the same particle size. In one non-limiting configuration, nozzle 12 can be use to generate a series of different groups of particles or powders. For example, a sieve or sieving nozzle can be used to separate the original powder mix into different size groups comprising a first group having particle sizes greater than 100 and up to about 125 microns, a second group having particle sizes between greater than about 75 microns and up to 100 microns, a third group having particle sizes between greater than 50 microns and up to 75 microns, and a fourth group having particles between 40 microns and 50 microns, as one non-limiting example.

The basis for the difference in displacement of different particles in the powder mix is based upon difference in density which is sufficient as between alloy powders and contaminants that a suitable cross-flow as discussed above generates sufficient different displacement that the largest low density contaminant is still displaced sufficiently more than the smallest high density alloy that the different materials are sufficiently separated that they can be collected separately.

Typical nickel-based superalloy will have a density of about 7,900 $kg/m^3$ while typical contaminants will typically have density that ranges between about 1,000 $kg/m^3$ at the low end to about 4,000 $kg/m^3$ (alumina) at the upper end. The difference in density of these different particles is sufficient that a cross-flow, for example of argon, at a velocity of 20 m/s, is effective to separate the different particles into different streams 18, 20 as discussed above. Under these conditions, at generally all different particle size groupings, the contaminant particles of alumina traveled about twice as far as the nickel-based superalloy particles. For the lighter particles of silica (about 2,200 $kg/m^3$), these particles traveled 3 times or more further than the nickel-based superalloy.

Table 1 below shows the difference in estimated distance traveled by nickel-based superalloy particles as compared to alumina and silica contaminant particles when subjected to a cross-flow as disclosed herein:

TABLE 1

| argon gas | nickel-based superalloy | alumina | silica |
|---|---|---|---|
| Deflected distance (mm) | Particle density 7900 $kg/m^3$ | Particle density 3990 $kg/m^3$ | Particle density 2200 $kg/m^3$ |
| Particle size 43 μm | 6.8 | 13.4 | 24.3 |
| Particle size 53 μm | 3.5 | 7.0 | 12.7 |
| Particle size 74 μm | 2.3 | 4.5 | 8.1 |
| Part. Size 100 μm | 1.5 | 2.9 | 5.2 |
| Part. Size 124 μm | 1.0 | 2.0 | 3.6 |

This shows the clear effectiveness of the disclosed subject matter in separating powders from a stream as desired.

Still further, Table 2 below shows the difference in estimated distances traveled in each particle size group for the smallest alloy particle and the largest alumina particle on the one hand, and between the smallest alloy particle and the largest silica particle on the other hand:

TABLE 2

| | Separated distance between smallest alloy powder and largest alumina in each group (mm) | Separated distance between smallest alloy powder and largest silica in each group (mm) |
|---|---|---|
| Group 1 125-100 μm | 0.55 | 2.2 |
| Group 2 100-75 μm | 0.65 | 3.0 |
| Group 3 75-50 μm | 0.90 | 4.5 |
| Group 4 50-40 μm | 0.20 | 5.9 |

Returning to FIG. 1, another aspect of the disclosed method is the height of the cross-flow 16, or put another way, the vertical distance that the particles travel while being subjected to the cross-flow. This distance is shown in FIG. 1 at 24. In the example set forth above, this distance was 0.05 m. This distance can be greater or smaller, as might be well suited to the specific powder being treated. A shorter distance can insufficiently displace the different materials from each other, while a longer distance risks displacing all particles further than might be desired.

In another disclosed non-limiting configuration, a further treatment can be done for more separation after the present method. For example, the separated nickel-based superalloy particles can be further subjected to electromagnetic or electric particle separation using techniques that would be known to a person having skill in the art.

Another aspect of the present disclosure is the drag that will be exerted on the particles, which is a function of the Reynolds number and drag coefficient of the particles, as well as the particle shape which is in this case assumed to be substantially spherical.

Figure 2:
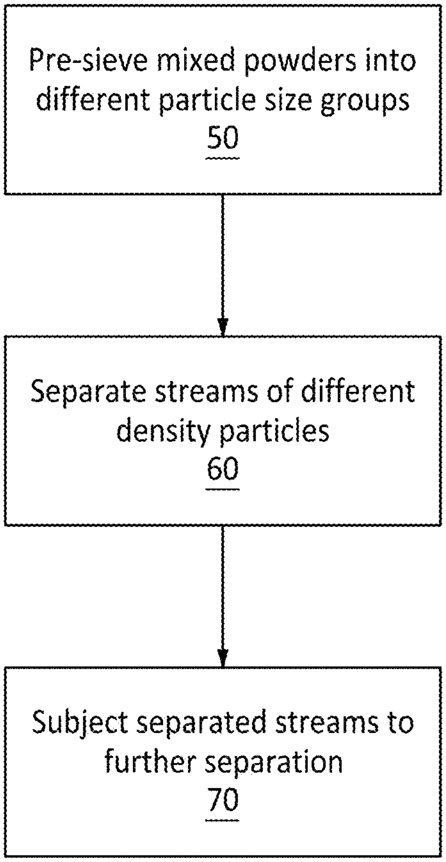
FIG. 2 schematically illustrates a method as disclosed herein.

The method as disclosed herein can be further considered with respect to the flow chart in FIG. 2. FIG. 2 shows an optional first step 50 of subjecting the mixture of alloy and contaminant powders to a sieving step to separate the powders into subsets or groups of different particle size ranges. This can be accomplished with sieves of different gauge, as one non-limiting example.

In the next step 60, the mixture of powders is fed to an apparatus such as that shown in FIG. 1, or other apparatus, such that the powders are established in a stream that is subject to a cross flow of gas as discussed above. The cross-flow of gas alters the path of particles that it encounters, and causes the lighter or less dense particles to travel further laterally away from the initial path. This results in separate streams of particles that are separated based upon different density, such as streams 18, 20 (FIG. 1).

Then, in a further optional step 70, separated streams 18, 20 can be further subjected to electromagnetic or magnetic separation or other process to further separate alloy particles from contaminant particles.

The foregoing description is exemplary of the subject matter of the subject matter disclosed herein. Various non-limiting embodiments are disclosed, however, one of ordinary skill in the art would recognize that various modifications and variations in light of the above teachings will fall within the scope of the appended claims. It is therefore to be appreciated that within the scope of the appended claims, the disclosure may be practiced other than as specifically described. Thus, the scope of the present claims is not specifically limited by the details of specific embodiment disclosed herein, but rather the claims define the full and reasonable scope of the disclosure.

I claim:

1. A method for gas flow separation of powders, comprising:

establishing a vertical stream of mixed powders; and applying a cross-flow stream of gas to the vertical stream of mixed powders such that powders of different density are displaced by the cross-flow stream to a different extent, thereby forming separate streams of powders having different density, wherein the establishing step comprises flowing the mixed powders through a nozzle to create the vertical stream of mixed powders, and wherein the nozzle has a straight-line configuration and establishes a nozzle per inch of between 100 and 2,400 nozzles per inch (NPI).

2. The method of claim 1, wherein the vertical stream of mixed powders comprises a stream of superalloy powder mixed with contaminants having lower density than the superalloy powder.

3. The method of claim 2, wherein the superalloy powder comprises nickel-based superalloy powder.

4. The method of claim 2, wherein the contaminants are selected from the group comprising silica, alumina and mixtures thereof.

5. The method of claim 1, wherein the nozzle establishes a jetting speed for the mixed powders of between 1 and 100 m/s.

6. The method of claim 1, wherein the nozzle comprises a slot.

7. The method of claim 1, wherein the cross-flow stream of gas comprises a flow of air, $CO_2$ or inert gas.

8. The method of claim 7, wherein the inert gas is argon.

9. The method of claim 1, further comprising collecting separated powders from the separate streams of powders having different densities.

10. The method of claim 9, wherein the collecting step is conducted using a moving web apparatus to catch and transport at least one of the separated powders.

11. The method of claim 10, wherein the moving web catches the separated metal alloy powder and conveys the separated metal alloy powder to a further station for use.

12. The method of claim 1, wherein the establishing step is conducted with a gas that matches a gas used for the step of applying the cross-flow.

13. The method of claim 1, further comprising the step of sieving a starting group of mixed powders into different size groups, and then conducting the step of establishing the stream of the mixed powders for each of the different size groups.

14. The method of claim 13, wherein the different size groups comprise a first group having particle sizes greater than 100 and up to 125 microns, a second group having particle sizes between greater than 75 microns and up to 100 microns, a third group having particle sizes between greater than 55 microns and up to 75 microns, and a fourth group having particles between 40 microns and 55 microns.

15. The method of claim 1, further comprising feeding at least one of the separate streams of powders having different density to an electric or electromagnetic further separation step.

16. An apparatus for gas flow separation of powders, comprising:

a nozzle for establishing a stream of mixed powders, wherein the nozzle has a straight-line configuration; and a source of a stream of gas oriented to direct a cross-flow stream of gas across the stream of mixed powders such that powders of different density are displaced by the cross-flow stream to a different extent, thereby forming separate streams of powders having different density, wherein the nozzle establishes a nozzle per inch of between 100 and 2, 400 nozzles per inch (NPI).

17. The apparatus of claim 16, further comprising a moving web apparatus arranged to collect and transport at least one of the separate streams of powders.

* * * * *